(12) United States Patent
Yoon et al.

(10) Patent No.: US 9,087,647 B2
(45) Date of Patent: Jul. 21, 2015

(54) MULTILAYER CERAMIC CAPACITOR AND METHOD OF MANUFACTURING THE SAME

(71) Applicant: SAMSUNG ELECTRO-MECHANICS CO., LTD., Suwon, Gyunggi-do (KR)

(72) Inventors: Byung Kwon Yoon, Gyunggi-do (KR); Hyung Joon Kim, Gyunggi-do (KR); Jae Yeol Choi, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 144 days.

(21) Appl. No.: 13/764,273

(22) Filed: Feb. 11, 2013

(65) Prior Publication Data

US 2014/0160621 A1    Jun. 12, 2014

(30) Foreign Application Priority Data

Dec. 11, 2012  (KR) .................. 10-2012-0143822

(51) Int. Cl.
*H01G 4/30*  (2006.01)
*H01G 4/012*  (2006.01)
(Continued)

(52) U.S. Cl.
CPC .............. *H01G 4/30* (2013.01); *H01G 4/012* (2013.01); *H01G 4/12* (2013.01); *H01G 4/228* (2013.01); *Y10T 29/435* (2015.01)

(58) Field of Classification Search
CPC ......... H01G 4/005; H01G 4/12; H01G 4/012; H01G 4/232; H01G 4/30
USPC .................... 361/303, 321.2, 306.3
See application file for complete search history.

(56) References Cited

U.S. PATENT DOCUMENTS

| 6,683,782 B2 * | 1/2004 | Duva ............................ 361/311 |
| 6,829,134 B2 * | 12/2004 | Yamauchi et al. ............ 361/303 |
| 2004/0027787 A1 | 2/2004 | Yamauchi et al. |

(Continued)

FOREIGN PATENT DOCUMENTS

| JP | 10-289837 A | 10/1998 |
| JP | 2004-228514 A | 8/2004 |

(Continued)

OTHER PUBLICATIONS

Notice of Office Action Japanese Patent Application No. 2013-021131 dated Nov. 12, 2013 with English translation.

(Continued)

*Primary Examiner* — David M Sinclair
(74) *Attorney, Agent, or Firm* — McDermott Will & Emery LLP

(57) ABSTRACT

A multilayer ceramic capacitor includes a ceramic body; first and second internal electrodes including first and second body parts overlapped with each other and first and second lead-out parts having an overlap region and exposed to one surface of the ceramic body; first and second external electrodes formed on one surface of the ceramic body; and an insulating layer formed on one surface of the ceramic body, wherein first and second connection surfaces extended from end portions of the first and second body parts to end portions of the first and second lead-out parts are inclined, and when half of length of the internal electrode is defined as A and length from a center of the ceramic body to a starting point of the connection surface is defined as B, B/A satisfies $0.03 \leq B/A \leq 0.90$.

7 Claims, 4 Drawing Sheets

(51) Int. Cl.
*H01G 4/12* (2006.01)
*H01G 4/228* (2006.01)

(56) References Cited

U.S. PATENT DOCUMENTS

| | | | |
|---|---|---|---|
| 2005/0286203 A1* | 12/2005 | Togashi et al. | 361/301.4 |
| 2010/0206624 A1* | 8/2010 | Feichtinger | 174/260 |
| 2011/0096464 A1 | 4/2011 | Togashi et al. | |
| 2012/0113560 A1* | 5/2012 | Takashima et al. | 361/301.4 |
| 2012/0307414 A1* | 12/2012 | Kim et al. | 361/301.4 |

FOREIGN PATENT DOCUMENTS

| | | |
|---|---|---|
| JP | 2004-047536 A | 12/2004 |
| JP | 2009-026872 A | 2/2009 |
| JP | 2009-054973 A | 3/2009 |
| JP | 2011-91271 A | 5/2011 |
| JP | 2012-114353 A | 6/2012 |

OTHER PUBLICATIONS

Notice of Office Action Korean Patent Application No. 10-2012-0143822 dated Dec. 30, 2013 with English translation.

\* cited by examiner

US 9,087,647 B2

MULTILAYER CERAMIC CAPACITOR AND METHOD OF MANUFACTURING THE SAME

CROSS-REFERENCE TO RELATED APPLICATIONS

This application claims the priority of Korean Patent Application No. 10-2012-0143822 filed on Dec. 11, 2012, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same.

2. Description of the Related Art

In general, electronic components using a ceramic material include a capacitor, an inductor, a piezoelectric element, a varistor, a thermistor, and the like.

Among these ceramic electronic components, a multilayer ceramic capacitor (MLCC) is an electronic component having advantages such as miniaturization, high capacitance, and ease of mounting.

The multilayer ceramic capacitor is a chip shaped condenser mounted on circuit boards of various electronic products such as a display device, for example, a liquid crystal display (LCD), a plasma display panel (PDP), or the like, a computer, a personal digital assistants (PDA), a mobile phone, and the like, to serve to charge electricity or discharge electricity.

The multilayer ceramic capacitor may include a plurality of dielectric layers, internal electrodes disposed to face each other, having a dielectric layer interposed therebetween, and external electrodes electrically connected to the internal electrodes.

Recently, as electronic products have been gradually miniaturized, microminiaturization and super high capacitance of multilayer ceramic capacitors used in the electronic products have been required.

Therefore, a ceramic capacitor, in which thicknesses of the dielectric layers and the internal electrode are thin for microminiaturization of the product and the number of stacked dielectric layers is increased for super high capacitance, has been manufactured, but there was a limitation in increasing the capacitance of the product with only this configuration.

A multilayer ceramic capacitor having a structure in which an overlap region of the internal electrodes are increased in order to increase capacitance of the product and lead-out parts of the internal electrodes are exposed to the same surface of a ceramic body, such as a lower surface thereof, thereby allowing the lower surface of the capacitor to be mounted.

However, in the case of the multilayer ceramic capacitor using the lower surface thereof as a mounting surface, the length of exposed portions of the internal electrodes in the overlap region thereof is relatively long, such that there is a high possibility of short circuits.

A structure in which lead-out parts of internal electrodes are exposed to the same surface of a substrate has been disclosed in the following Patent Document 1, but a structure in which a connection portion between the lead-out parts and the internal electrodes has an inclined surface is not disclosed therein.

A structure in which a connection portion between lead-out parts and internal electrodes is inclined has been disclosed in the following Patent Document 2; however, the internal electrodes are alternately exposed to both ends of a ceramic body.

RELATED ART DOCUMENT (Patent Document 1) Japanese Patent Laid-open Publication No. 1998-289837
(Patent Document 2) Japanese Patent Laid-open Publication No. 2004-228514

SUMMARY OF THE INVENTION

An aspect of the present invention provides a multilayer ceramic capacitor capable of reducing a possibility of short circuits by reducing the length of exposed portions of internal electrodes in an overlap region thereof while increasing capacitance, and a method of manufacturing the same.

According to an aspect of the present invention, there is provided a multilayer ceramic capacitor including: a ceramic body in which a plurality of dielectric layers are stacked; a plurality of first and second internal electrodes alternately formed on the plurality of dielectric layers and including first and second body parts overlapped with each other and first and second lead-out parts having an overlap region and extended from one surfaces of the first and second body parts to be exposed to one surface of the ceramic body, respectively; first and second external electrodes formed on one surface of the ceramic body and electrically connected to the first and second lead-out parts, respectively; and an insulating layer formed on one surface of the ceramic body and covering exposed portions of the first and second lead-out parts, wherein first and second connection surfaces extended from end portions of the first and second body parts to end portions of the first and second lead-out parts are formed to be inclined, and when half of a length of the first or second internal electrode is defined as A and a length from a center of the ceramic body to a starting point of the first or second connection surface of the first or second lead-out part is defined as B, B/A is within a range of 0.03 to 0.90 (0.03≤B/A≤0.90).

The first and second connection surfaces may be flat inclined surfaces.

The first and second connection surfaces may be outwardly convex surfaces.

According to another aspect of the present invention, there is provided a method of manufacturing a multilayer ceramic capacitor, the method including: forming a first internal electrode by forming a first body part and a first lead-out part on a first ceramic sheet, the first lead-out part being extended from one surface of the first body part to be exposed to one surface of the first ceramic sheet; forming a second internal electrode by forming a second body part overlapped with the first body part and a second lead-out part on a second ceramic sheet, the second lead-out part being extended from one surface of the second body part to be exposed to one surface of the second ceramic sheet and having an overlap region with the first lead-out part; forming a ceramic body by alternately stacking and sintering the plurality of first and second ceramic sheets having the first and second internal electrodes formed thereon; forming first and second external electrodes on one surface of the ceramic body so as to be electrically connected to the first and second lead-out parts, respectively; and forming an insulating layer on one surface of the ceramic body so as to cover exposed portions of the first and second lead-out parts, wherein first and second connection surfaces extended from end portions of the first and second body parts to end portions of the first and second lead-out parts are formed to be inclined, and when half of a length of the first or second internal electrode is defined as A and a length from a center of the ceramic body to a starting point of the first or second connection surface of the first or second lead-out part is defined as B, B/A is within a range of 0.03 to 0.90 (0.03≤B/A≤0.90).

The forming of the insulating layer may include applying ceramic slurry to one surface of the ceramic body so as to cover the entire exposed portions of the first and second lead-out parts.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
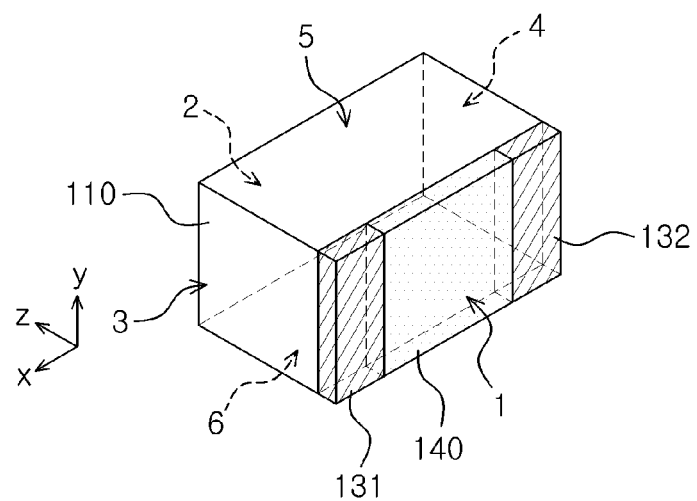
FIG. 1 is a transparent perspective view schematically showing a multilayer ceramic capacitor according to an embodiment of the present invention.

Embodiments of the present invention will be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

In the drawings, the shapes and dimensions of components may be exaggerated for clarity, and the same reference numerals will be used throughout to designate the same or like components.

Figure 2:
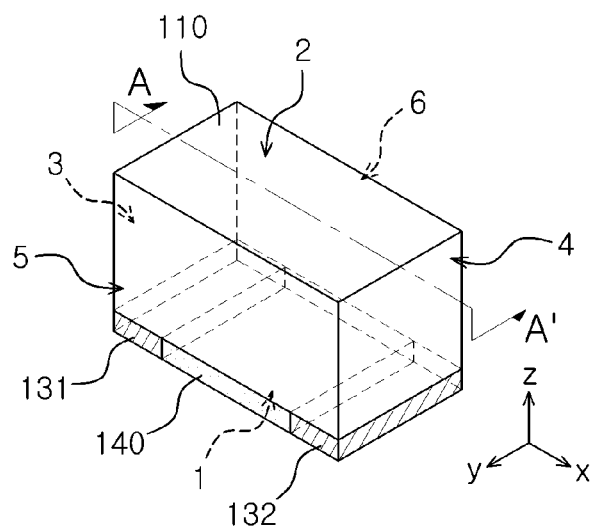
FIG. 2 is a transparent perspective view showing the multilayer ceramic capacitor of FIG. 1 in a direction in which the capacitor is mounted.
Figure 3:
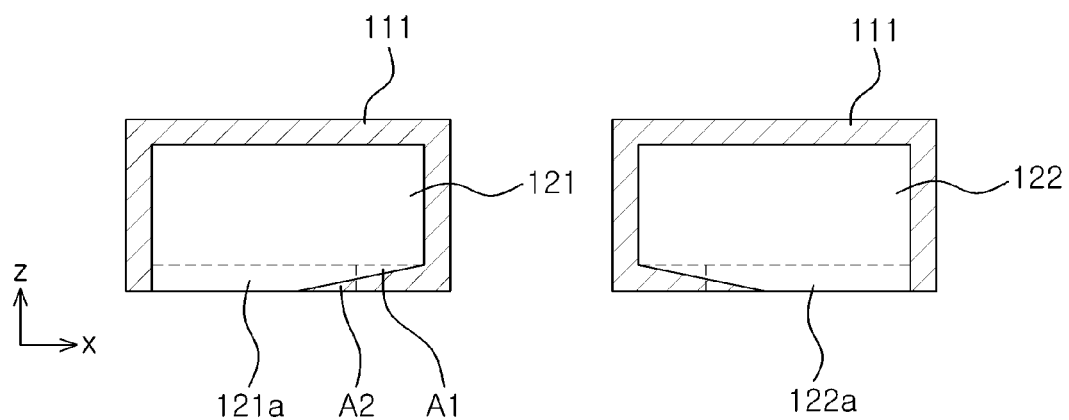
FIG. 3 is a transversal cross-sectional view showing first and second internal electrodes of the multilayer ceramic capacitor of FIG. 1.
Figure 4:
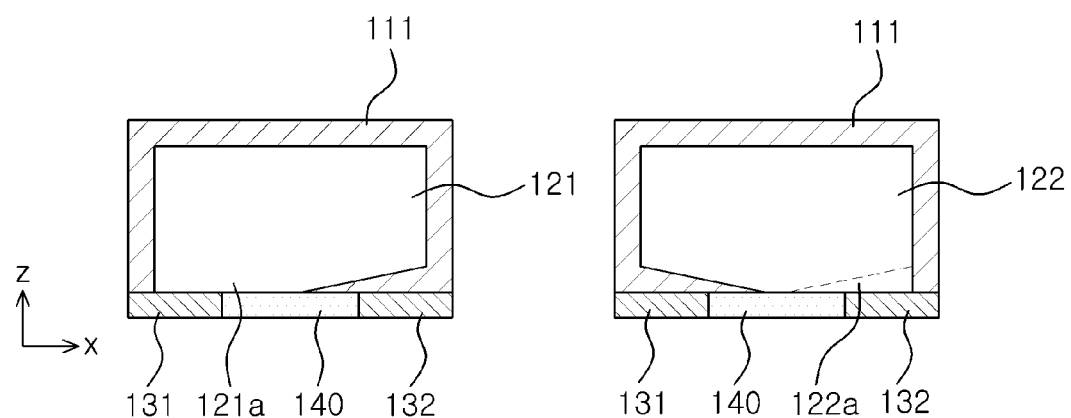
FIG. 4 is a transversal cross-sectional view showing a structure in which first and second external electrodes and an insulating layer are formed on the first and second internal electrodes of FIG. 3.

FIG. 1 is a transparent perspective view schematically showing a multilayer ceramic capacitor according to an embodiment of the present invention; FIG. 2 is a transparent perspective view showing the multilayer ceramic capacitor of FIG. 1 in a direction in which the capacitor is mounted; FIG. 3 is a transversal cross-sectional view showing first and second internal electrodes of the multilayer ceramic capacitor of FIG. 1; and FIG. 4 is a transversal cross-sectional view showing a structure in which first and second external electrodes and an insulating layer are formed on the first and second internal electrodes of FIG. 3.

According to the embodiment of the present invention, an x-direction refers to a direction in which first and second external electrodes 131 and 132 are formed, having a predetermined interval therebetween, a y-direction refers to a direction in which first and second internal electrodes 121 and 122 are stacked, having a dielectric layer 111 interposed therebetween, and a z-direction refers to a width direction of a ceramic body 110 in which first and second lead-out parts 121a and 122a of the first and second internal electrodes 121 and 122 are exposed.

Referring to FIGS. 1 through 4, a multilayer ceramic capacitor 100 according to the embodiment of the present invention may include a ceramic body 110, the first and second internal electrodes 121 and 122 formed in the ceramic body 110, and the first and second external electrodes 131 and 132 and an insulating layer 140 formed on one surface of the ceramic body 110.

According to the present embodiment, the ceramic body 110 may have first and second surfaces 1 and 2 facing each other, and third to six surfaces 3 to 6 connecting the first and second surfaces 1 and 2 to each other. According to the embodiment of the present invention, the first surface 1 of the ceramic body 110 may be a mounting surface disposed on a mounting region of a circuit board.

A shape of the ceramic body 110 is not particularly limited, but may be a rectangular parallelepiped shape having the first to sixth surfaces 1 to 6 as shown. Further, a size of the ceramic body 110 is not particularly limited. For example, the ceramic body 110 may have a size of 1.0 mm×0.5 mm, thereby configuring a multilayer ceramic capacitor having high capacitance.

The ceramic body 110 may be formed by stacking a plurality of dielectric layers 111 and then sintering the stacked dielectric layers 111. Here, the plurality of dielectric layers 111 configuring the ceramic body 110 are in a sintered state and are integrated such that a boundary therebetween may not be clearly discernible.

The dielectric layers 111 may be formed by sintering ceramic green sheets including a ceramic powder, an organic solvent, and an organic binder. As the ceramic powder having high permittivity, a barium titanate ($BaTiO_3$) based material, a strontium titanate ($SrTiO_3$) based material, or the like, may be used. However, the ceramic powder is not limited thereto.

After the first and second internal electrodes 121 and 122 may be formed on the ceramic green sheets forming the dielectric layers 111 and alternately stacked, the first and second internal electrodes 121 and 122 may be disposed to face each other in the ceramic body 110 in the y-direction, having one dielectric layer 111 interposed therebetween.

The first and second internal electrodes 121 and 122 may be electrically insulated from each other by the dielectric layer 111 disposed therebetween. According to the embodiment of the present invention, the first and second internal electrodes 121 and 122 may be disposed vertically with respect to the mounting surface, that is, the first surface 1, of the multilayer ceramic capacitor.

The first and second internal electrodes 121 and 122 may be formed by printing a conductive paste including a conductive metal on at least one surface of the dielectric layer 111. In this case, the conductive metal may be Ni, Cu, Pd, or an alloy thereof, but is not limited thereto. In addition, as a method of printing the conductive paste, a screen printing method, a gravure printing method, or the like, may be used, but the present invention is not limited thereto.

In the present embodiment, the first and second internal electrodes 121 and 122 may have first and second body parts overlapped with each other in the y-direction and first and second lead-out parts 121a and 122a extended from the first and second body parts to the first surface 1 of the ceramic body 110 to thereby be exposed to the first surface 1.

In this case, the first and second lead-out parts 121a and 122a may have an overlap region. Exposed portions of the first and second lead-out parts 121a and 122a contact the first and second external electrodes 131 and 132 formed on the first surface 1 of the ceramic body 110 to be electrically connected to the first and second external electrodes 131 and 132, respectively.

In the dielectric layers 111 according to the present embodiment, first and second margin parts that are not overlapped with each other may be provided in the width direction in positions adjacent to one end portion of the first lead-out part 121a and the other end portion of the second lead-out part 122a.

In the case of the existing multilayer ceramic capacitor of which the lower surface is mounted, a shape of the margin part in the width direction is a right-angle groove. However, in the present embodiment, first and second connection surfaces extended from end portions of the first and second body parts to end portions of the first and second lead-out parts 121a and 122a, respectively, may be inclined, and surfaces of the first and second margin parts of the dielectric layers 111 corresponding to the first and second connection surfaces may be inclined.

Due to the first and second connection surfaces inclined as described above, an overlap region A1 increased as compared with the related art is larger than a decreased overlap region A2, such that capacitance may be increased. In addition, the first and second inclined connection surfaces may allow the margin parts in the z-direction to be decreased, such that a step in the dielectric layer 111 may be decreased, whereby a possibility of generation of cracks may be reduced.

In the present embodiment, the first and second connection surfaces may be flat inclined surfaces.

In this case, when half of a length of the first or second internal electrode 121 or 122 is defined as A and a length from a center of the ceramic body 110 to a point at which the first or second connection surface of the first or second lead-out part 121a or 122a starts is defined as B, B/A may be within a range of 0.03 to 0.90 ($0.03 \leq B/A \leq 0.90$), and a possibility of generation of short circuits may be significantly reduced within this range.

This numerical limitation is intended to reduce a generation rate of short circuits while increasing capacitance, as compared with a capacitor according to the related art, by moving the starting point of the first and second connection surfaces of the first and second lead-out parts 121a and 122a to the center of the ceramic body.

In the case in which B/A is less than 0.03, a space between the first and second lead-out parts 121a and 122a may not be appropriately secured, such that an effect of reducing the generation rate of the short circuits may be insignificant. In the case in which B/A is more than 0.9, a contact area of the lead-out parts in contact with the external electrodes may be significantly reduced, such that a contact defect and a problem in distribution of capacitance may be generated.

In addition, since the overlap region increased by the first and second connection surfaces may be larger than the decreased overlap region, the capacitance may be increased. In addition, the margin part in the z-direction may be decreased, such that the step in the dielectric layer 111 may be decreased, thereby reducing the possibility of generation of cracks.

The first and second external electrodes 131 and 132 may contact the first and second lead-out parts 121a and 122a to thereby be electrically connected to the first and second lead-out parts 121a and 122a, respectively. The first external electrode 131 may be connected to a region of the first lead-out part 121a that is not overlapped with the second lead-out part 122a, and the second external electrode 132 may be connected to a region of the second lead-out part 122a that is not overlapped with the first lead-out part 121a.

In the rightward view of FIG. 4, an overlap region between the first margin part of the first internal electrode 121 and the second lead-out part 122a of the second internal electrode 122 is indicated by a dotted line.

The insulating layer 140 may be formed between the first and second external electrodes 131 and 132 on the first surface 1 of the ceramic body 110. The insulating layer 140 may be formed to cover the exposed portions of the first and second lead-out parts 121a and 122a exposed to the first surface 1 of the ceramic body 110, and as necessary, the insulating layer 140 may be formed to cover the entire overlap region between the first and second lead-out parts 121a and 122a.

In addition, the insulating layer 140 may be formed to completely fill the first surface 1 of the ceramic body 110 between the first and second external electrodes 131 and 132. However, the present invention is not limited thereto. The insulating layer 140 may cover only the overlap region between the first and second lead-out parts 121a and 122a to be spaced apart from the first and second external electrodes 131 and 132 by a predetermined interval.

The insulating layer 140 formed as described above may serve to prevent short circuits between the first and second internal electrodes 121 and 122 and the first and second external electrodes 131 and 132 and prevent internal defects such as deterioration in resistance to moisture, or the like.

Figure 5:
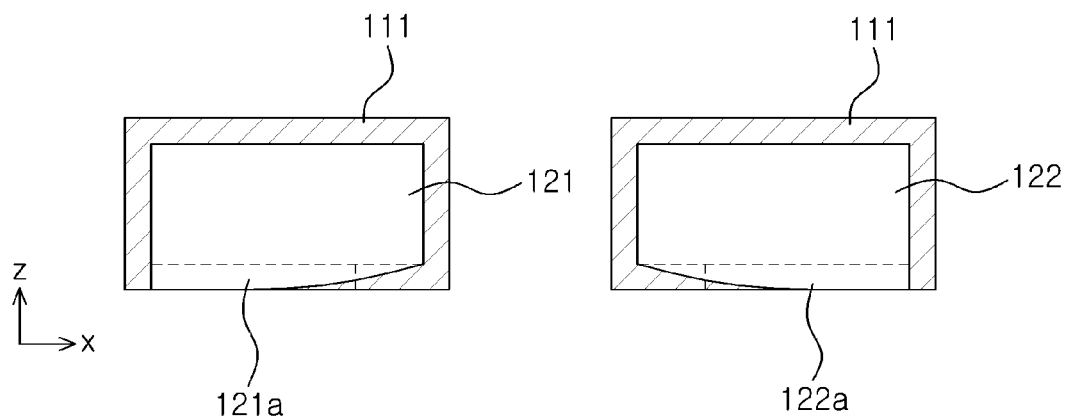
FIG. 5 is a transversal cross-sectional view showing first and second internal electrodes of a multilayer ceramic capacitor according to another embodiment of the present invention.
Figure 6:
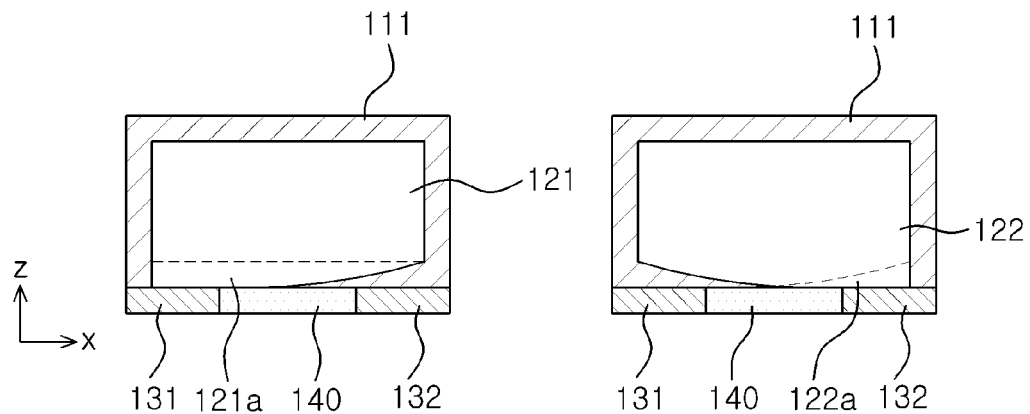
FIG. 6 is a transversal cross-sectional view showing a structure in which first and second external electrodes and an insulating layer are formed on the first and second internal electrodes of FIG. 5.
Figure 7:
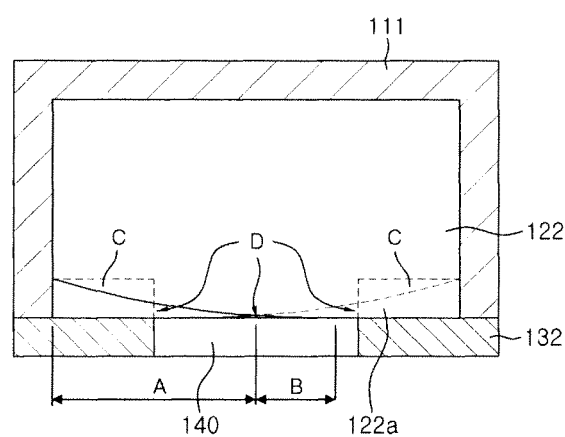
FIG. 7 is a transversal cross-sectional view showing a structure in which the first and second internal electrodes of FIG. 5 are stacked in a y-direction.

FIG. 5 is a transversal cross-sectional view showing first and second internal electrodes of a multilayer ceramic capacitor according to another embodiment of the present invention; FIG. 6 is a transversal cross-sectional view showing a structure in which first and second external electrodes and an insulating layer are formed on the first and second internal electrodes of FIG. 5; and FIG. 7 is a transversal cross-sectional view showing a structure in which the first and second internal electrodes of FIG. 5 are stacked in a y-direction. Hereinafter, components different from the components in the above-mentioned embodiment will be mainly described, and a detailed description of the same components will be omitted.

Referring to FIGS. 5 through 7, in the multilayer ceramic capacitor according to the present embodiment, first and second connection surfaces extended from end portions of first and second body parts of the first and second internal electrodes 121 and 122 to end portions of first and second lead-out parts 121a and 122a may be curved to be outwardly convex.

In this case, when half of a length of the first or second internal electrode 121 or 122 is defined as A and a length from the center of the ceramic body 110 to a point at which the first or second connection surface of the first or second lead-out part 121a or 122a starts is defined as B, B/A may be within a range of 0.03 to 0.90 ($0.03 \leq B/A \leq 0.90$), and the generation of short circuits may be significantly reduced within this range.

In the case in which B/A is less than 0.03, a space between the first and second lead-out parts 121a and 122a may not be appropriately secured, such that an effect of reducing the generation rate of the short circuits may be insignificant, and in the case in which B/A is more than 0.9, a contact area of the lead-out parts in contact with the external electrodes may be significantly reduced, such that a contact defect and a problem in distribution of capacitance may be generated.

In addition, since an overlap region C increased by the first and second connection surfaces is larger than a decreased overlap region D, capacitance may be increased. In addition, the margin part in the z-direction may be decreased, such that a step in the dielectric layer 111 may be decreased, thereby reducing the possibility of cracks.

Hereinafter, a method of manufacturing a multilayer ceramic capacitor according to an embodiment of the present invention will be described.

First, a plurality of first and second ceramic sheets may be prepared.

The first and second ceramic sheets, forming the dielectric layers 111 of the ceramic body 110, may be manufactured by mixing a ceramic powder, a polymer, and a solvent to prepare slurry and manufacturing the prepared slurry as sheets having a thickness of several μm by a doctor blade method, or the like.

The ceramic powder may include a barium titanate (BaTiO$_3$) based material. However, the present invention is not limited thereto. For example, the ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which BaTiO$_3$ is commonly used with Ca, Zr, or the like.

The slurry may be prepared by mixing a ceramic additive, an organic solvent, a plasticizer, a binder, and a dispersant with the ceramic powder material using a basket mill.

Next, the first and second internal electrodes 121 and 122 may be formed by printing a conductive paste on at least one surface of the first and second ceramic sheets at a predetermined thickness.

The first internal electrode 121 may be formed to have a first body part and the first lead-out part 121a extended from one surface of the first body part and exposed to one surface of the first ceramic sheet. In this case, one corner portion of the first lead-out part 121a may be provided with the first margin part.

The second internal electrode 122 may be formed to have a second body part overlapped with the first body part in the y-direction and the second lead-out part 122a extended from one surface of the second body part and exposed to one surface of the second ceramic sheet. In this case, the other corner portion of the second lead-out part 122a may be provided with the second margin part that is not overlapped with the first margin part.

As a method of printing the conductive paste, a screen printing method, a gravure printing method, or the like, may be used, and the conductive paste may include a metal powder, a ceramic powder, a silica (SiO$_2$) powder, or the like.

Here, the first and second connection surfaces extended from the end portions of the first and second body parts and the end portions of the first and second lead-out parts 121a and 122a, respectively, may be formed to be inclined. For example, the first and second connection surfaces may be flat inclined surfaces or outwardly convex surfaces, but the present invention is not limited thereto.

In this case, when half of a length of the first or second internal electrode 121 or 122 is defined as A, and a length from a center of the ceramic body 110 to a starting point of the first or second connection surface is defined as B, B/A may be within a range of 0.03 to 0.90 ($0.03 \leq B/A \leq 0.90$).

Then, the plurality of first and second ceramic sheets including the first and second internal electrodes 121 and 122 formed thereon are alternately stacked and pressed in the stacked direction, whereby the stacked first and second ceramic sheets and the first and second internal electrodes 121 and 122 are compressed. Through the above-mentioned process, a stacked body in which the plurality of dielectric layers 111 and the plurality of first and second internal electrodes 121 and 122 are alternately stacked may be formed.

Next, the stacked body may be cut per a region corresponding to each capacitor to be formed as a chip, and the chip is plasticized and sintered at a high temperature, followed by polishing the sintered chip. In this manner, the ceramic body 110 having the first and second internal electrodes 121 and 122 is obtained.

Then, the first and second external electrodes 131 and 132 are formed on the first surface 1 of the ceramic body 110 to be in contact with the exposed portions of first and second lead-out parts 121a and 122a, such that the first and second external electrodes 131 and 132 may be electrically connected to the first and second lead-out parts, respectively.

The first external electrode 131 may be formed to be vertically elongated in a region of the first surface 1 of the ceramic body 110 in which the first lead-out part 121a is not overlapped with the second lead-out part 122a in a thickness direction of the ceramic body 110. The second external electrode 132 may be formed to be vertically elongated in a region of the first surface 1 of the ceramic body 110 in which the second lead-out part 122a is not overlapped with the first lead-out part 121a in the thickness direction of the ceramic body 110.

In the above-described configuration, the first surface 1 of the ceramic body 110 may be amounting surface when mounted on a substrate, or the like.

Next, the insulating layer 140 may be formed by applying the ceramic slurry to cover the portions of the first and second lead-out parts 121a and 122a exposed to the first surface 1 of the ceramic body 110. As a method of applying the slurry, for example, a spray method, a method of using a roller, or the like may be used, but the present invention is not limited thereto.

As set forth above, in a multilayer ceramic capacitor according to embodiments of the present invention, the length of exposed portions of the first and second lead-out parts in an overlap region thereof may be reduced to thereby decrease a possibility of short circuits and increase capacitance, whereby the reliability of the multilayer ceramic capacitor may be improved.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body in which a plurality of dielectric layers are stacked;
   a plurality of first and second internal electrodes alternately formed on the plurality of dielectric layers and including first and second body parts overlapped with each other and first and second lead-out parts having an overlap region and extended from one surfaces of the first and second body parts to be exposed to one surface of the ceramic body, respectively;
   first and second external electrodes formed on one surface of the ceramic body and electrically connected to the first and second lead-out parts, respectively; and
   an insulating layer formed on one surface of the ceramic body and covering exposed portions of the first and second lead-out parts,
   wherein first and second connection surfaces extended from end portions of the first and second body parts to end portions of the first and second lead-out parts are formed to be inclined, half of a length of the first or second internal electrode is defined as A and a length from a center of the ceramic body to a starting point of the first or second connection surface of the first or second lead-out part is defined as B, B/A is within a range of 0.03 to 0.90 (0.03≤B/A≤0.90), the end portions of the first body parts and the end portions of the first lead-out parts are formed on opposite sides of a center of the first internal electrode, and the end portions of the second body parts and the end portions of the second lead-out parts are formed on opposite sides of a center of the second internal electrode.

2. The multilayer ceramic capacitor of claim 1, wherein the first and second connection surfaces are flat inclined surfaces.

3. The multilayer ceramic capacitor of claim 1, wherein the first and second connection surfaces are outwardly convex surfaces.

4. A method of manufacturing a multilayer ceramic capacitor, the method comprising:

forming a first internal electrode by forming a first body part and a first lead-out part on a first ceramic sheet, the first lead-out part being extended from one surface of the first body part to be exposed to one surface of the first ceramic sheet;

forming a second internal electrode by forming a second body part overlapped with the first body part and a second lead-out part on a second ceramic sheet, the second lead-out part being extended from one surface of the second body part to be exposed to one surface of the second ceramic sheet and having an overlap region with the first lead-out part;

forming a ceramic body by alternately stacking and sintering the plurality of first and second ceramic sheets having the first and second internal electrodes formed thereon;

forming first and second external electrodes on one surface of the ceramic body so as to be electrically connected to the first and second lead-out parts, respectively; and forming an insulating layer on one surface of the ceramic body so as to cover exposed portions of the first and second lead-out parts, wherein first and second connection surfaces extended from end portions of the first and second body parts to end portions of the first and second lead-out parts are formed to be inclined, half of a length of the first or second internal electrode is defined as A and a length from a center of the ceramic body to a starting point of the first or second connection surface of the first or second lead-out part is defined as B, B/A is within a range of 0.03 to 0.90 (0.03≤B/A≤0.90), the end portions of the first body parts and the end portions of the first lead-out parts are formed on opposite sides of a center of the first internal electrode, and the end portions of the second body parts and the end portions of the second lead-out parts are formed on opposite sides of a center of the second internal electrode.

5. The method of claim 4, wherein, in the forming of the first and second internal electrodes, the first and second connection surfaces are flat inclined surfaces.

6. The method of claim 4, wherein, in the forming of the first and second internal electrodes, the first and second connection surfaces are outwardly convex surfaces.

7. The method of claim 4, wherein the forming of the insulating layer includes applying ceramic slurry to one surface of the ceramic body so as to cover the entire exposed portions of the first and second lead-out parts.

* * * * *